(12) United States Patent
dos Santos Silva et al.

(10) Patent No.: US 11,796,752 B2
(45) Date of Patent: Oct. 24, 2023

(54) FIBER OPTIC MODULE, FIBER OPTIC MODULE KIT, AND OPTICAL PATCH PANEL

(71) Applicant: Rosenberger Hochfrequenztechnik Gmbh & Co. KG, Fridolfing (DE)

(72) Inventors: Gabriel Cenato dos Santos Silva, São José dos Campos (BR); Darshan Suresh Patell, Plano, TX (US); Silke Nothdurft, Guenzburg (DE); Nico Lehmann, Augsburg-Hochzoll (DE); Jiwei Sun, Shanghai (CN); Min Ma, Plano, TX (US); Chunsheng Li, Shanghai (CN); Harald Jungbaeck, Maisach (DE); Denise Selina Nothegger, Stadtbergen (DE); Lucimar Rodolfo Silveira, São José dos Campos (BR); Monique Paula Jardim Garcia, São José dos Campos (BR); Daniel Cunha Cavalcante, São José dos Campos (BR); Huiyong Sun, Shanghai (CN); Norbert Paul Bockisch, Augsburg (DE); Christian Goldhammer, Gersthofen (DE); Ronny Mees, Vilshofen (DE); Benjamin Weigand, Augsburg (DE)

(73) Assignee: Rosenberger Hochfrequenztechnik Gmbh & Co. KG, Fridolfing (DE)

(*) Notice: Subject to any disclaimer, the term of this patent is extended or adjusted under 35 U.S.C. 154(b) by 61 days.

(21) Appl. No.: 17/364,255

(22) Filed: Jun. 30, 2021

(65) Prior Publication Data
US 2022/0003955 A1  Jan. 6, 2022

(30) Foreign Application Priority Data

Jul. 1, 2020 (CN) .......................... 202010622941.4
Jul. 7, 2020 (EP) ..................................... 20184551

(51) Int. Cl.
G02B 6/00 (2006.01)
G02B 6/44 (2006.01)
G02B 6/38 (2006.01)

(52) U.S. Cl.
CPC ............ G02B 6/4455 (2013.01); G02B 6/389 (2013.01); G02B 6/3897 (2013.01); G02B 6/4452 (2013.01); G02B 6/4471 (2013.01)

(58) Field of Classification Search
CPC .... G02B 6/4455; G02B 6/389; G02B 6/3897; G02B 6/4452; G02B 6/4471; G02B 6/00
See application file for complete search history.

(56) References Cited

U.S. PATENT DOCUMENTS

| 8,184,938 B2 | 5/2012 | Cooke |
| 9,678,296 B2 * | 6/2017 | Krampotich ......... G02B 6/4446 |

(Continued)

FOREIGN PATENT DOCUMENTS

| NL | 2 008 155 C2 | 7/2013 |
| WO | 2011130000 A1 | 10/2011 |

OTHER PUBLICATIONS

European Search Report dated Dec. 11, 2020.

*Primary Examiner* — Jennifer Doan
(74) *Attorney, Agent, or Firm* — Randall Danskin P.S.

(57) ABSTRACT

A fiber optic module for installation within patch panel, the fiber optic module comprising a first outer wall with a first rail profile on its outside surface, a second outer wall with a second rail profile on its outside surface, and at least one optical connector. The first outer wall and the second outer wall run parallel to each other. The at least one optical connector is arranged between the first outer wall and the second outer wall. The first rail profile and the second rail profile are complementary to each other such that the fiber optic module may be coupled to an adjacent fiber optic (Continued)

module, wherein the first rail profile of the fiber optic module may be coupled to the second rail profile of the adjacent fiber optic module.

17 Claims, 9 Drawing Sheets

(56) References Cited

U.S. PATENT DOCUMENTS

2010/0322581 A1   12/2010  Cooke
2017/0192191 A1    7/2017  Dagley
2022/0066115 A1*  3/2022  Cooke .................. G02B 6/4452

* cited by examiner

FIBER OPTIC MODULE, FIBER OPTIC MODULE KIT, AND OPTICAL PATCH PANEL

CROSS REFERENCE TO RELATED APPLICATIONS

This Non-Provisional patent application is a United States National Stage patent application which claims the benefit of priority to earlier filed Chinese Patent Application No. 202010622941.4, which was filed on 1 Jul. 2020, and further claims the benefit of priority to earlier filed European Patent Application No. 20 184 551.8, which was filed on 7 Jul. 2020. The entire contents of the aforementioned earlier filed Chinese Patent Application and earlier filed European Patent Application are both expressly incorporated herein by this reference.

Pursuant to USPTO rules, this foreign priority claim to earlier filed Chinese Patent Application No. 202010622941.4 and to earlier filed European Patent Application No. 20 184 551.8 is also included in the Application Data Sheet (ADS) filed herewith.

On 10 Jun. 2020 the USPTO granted an Expedited Foreign Filing License for this invention, under License Number 612,740.

TECHNICAL FIELD

The invention relates to a fiber optic module for installation within a patch panel, the fiber optic module comprising a first outer wall with a first rail profile on its outside surface, a second outer wall with a second rail profile on its outside surface, and at least one optical connector.

The invention also relates to a fiber optic module kit for installation within a patch panel, comprising at least two fiber optic modules.

Furthermore, the invention relates to an optical patch panel for installation in a distribution frame, the patch panel comprising at least one fiber optic module kit and a chassis for receiving the at least one fiber optic module kit.

BACKGROUND

In a data center, patch panels (also known as "distribution panels") for connecting and routing of circuit connections are commonly installed in a distribution frame (also known as "rack"). Each patch panel can be inserted in a corresponding slot at a specific altitude level in the distribution frame. Such a patch panel comprises a large number of connectors which should be accessible to the operator.

For high density and modularity, groups of connectors are often arranged in common modules, wherein several modules can be received in a corresponding chassis of the patch panel.

Due to the growing needs to transmit a large volume of data signals over relatively long distances with little or no signal degradation, optical fibers and optical connectors are widely used in the telecommunication field. Therefore, specific patch panels comprising fiber optic connectors are frequently utilized.

In order to receive multiple fiber optic modules, which may be different in size, the chassis of the patch panel often comprises a mounting frame with a front plate with specific partitioning such that the fiber optic modules can be inserted into corresponding openings from the frontside of the patch panel. Punch holes can be distributed over the front plate of the mounting frame to attach the modules via pins to the mounting frame.

One disadvantage of such a patch panel is the intrinsic association of its mounting frame to one specific configuration of fiber optic modules. If the configuration of fiber optic modules inside the patch panel needs to be changed, e.g., by customer demands, the entire mounting frame has to be replaced.

Another known possibility to equip a patch panel with fiber optic modules is to insert the fiber optic modules individually between rail guides/rail profiles of the patch panel. As proposed in U.S. Pat. No. 8,184,938 B2, either the chassis of the patch panel, and/or individual trays of the chassis, may provide such rail profiles for guiding and attaching the fiber optic modules into the patch panel.

By using the rail profiles to guide the modules into the patch panel, the attachment and the comfort for the operator can be improved. However, the chassis and/or its trays still lack in flexibility with regard to a modular and simple way of modifying a fiber optic module arrangement. For different layouts, the trays and/or the chassis of the patch panel need to be exchanged completely. An arbitrary combination of modules of different sizes is not readily possible.

An object of this invention is to present an enhanced fiber optic module and an enhanced fiber optic module kit which can be installed in a patch panel in a flexible and comfortable way.

It is also an object of this invention to present an optical patch panel, particularly a patch panel offering high flexibility and comfort for the installation of different types of fiber optic modules.

Embodiments of the invention are also set forth and disclosed in the claims submitted herewith.

A fiber optic module for installation within a patch panel comprises a first outer wall with a first rail profile on its outside surface, a second outer wall with a second rail profile on its outside surface, and at least one optical connector.

The first rail profile and the second rail profile may form a common rail configuration.

The fiber optic module may comprise a frontside for providing access to frontside interfaces of the optical connectors, and a backside located opposite to the frontside. The backside of the fiber optic module may comprise one or more backside ports (preferably exactly one backside port) being connected to the optical connectors of the respective fiber optic module.

The first outer wall and the second outer wall may establish a connection between the frontside and the backside of the fiber optic module. The first outer wall and the second outer wall can be arranged opposite to each other.

Further, the first outer wall and the second outer wall extend parallel to one another, wherein the at least one optical connector is arranged between the first outer wall and the second outer wall. Most preferably, also the first rail profile and the second rail profile extend parallel to one another.

An optical connector according to the invention may—for example only, and without limitation,—be an LC-connector (also known as Lucent Connector, Little Connector or Local Connector), SC-connector (also known as Subscriber Connector, Square Connector or Standard Connector), 3M™ Expanded Beam Optical Interconnect, MDC connector (US Conec), Senko SN® connector, or MPO-connector (also known as Multifiber Push-On or Multipath Push-On Connector). The optical connector can have between one and sixteen or even more optical inner conductors, preferably one to eight inner conductors, most preferably exactly one or two optical inner conductors. In general, the invention shall not be limited to any specific type of optical connector.

Further, the first rail profile and the second rail profile are complementary to each other (the first rail profile and the second rail profile may be complementary rail profiles) such that the fiber optic module may be coupled to an adjacent fiber optic module, wherein the first rail profile of the fiber optic module may be coupled to the second rail profile of the adjacent fiber optic module (and wherein the second rail profile of the fiber optic module may be coupled to the first rail profile of the adjacent fiber optic module).

The adjacent fiber optic module may have a common rail configuration corresponding, preferably being equal to, the common rail configuration of the fiber optic module.

In contrast to known state of the art, the invention suggests to use rail guides in between the individual modules. Thus, there is no need for any kind of predefinition of the chassis, the patch panel, or a mounting frame. This allows for much higher flexibility in equipping and modifying the patch panels. The invention can be especially beneficial in the context of move, add and change processes (MACS).

The invention allows for direct module-to-module connection and permits a free combination of any needed types and/or sizes of fiber optic modules. The proposed rail configuration enables interlocking of two or more adjacent modules.

According to the invention, the modules themselves may serve as a guide and holding structure. The assembling of several fiber optic modules can be done without the need of additional mounting parts or structures within the chassis or the patch panel.

Due to the proposed design of rail profiles with the possibility to couple adjacent fiber optic modules directly, the port density of the patch panel, (i. e., the number of optical connectors per patch panel), can be increased.

In a preferred embodiment of the invention, the first outer wall is a first side wall and the second outer wall is a second side wall.

Thus, it can be possible to connect several fiber optic modules side-by-side in a common row of modules. Such a fiber optic module kit may be inserted into the patch panel, e. g., by sliding the rail profiles of the outermost modules inside corresponding rail profiles of the chassis of the patch panel. However, the fiber optic module kit may also be attached to the chassis of the patch panel differently. It is not necessarily required to slide the fiber optic module kit into the patch panel by using the rail profiles of the outermost modules of the fiber optic module kit.

Alternatively, (or additionally), the first outer wall may also be a bottom plate of the fiber optic module, and the second outer wall may be a cover plate of the fiber optic module. Thereby, several fiber optic modules may also be connected on top of each other, forming a stack of fiber optic modules.

According to an advantageous embodiment of the invention, two or more optical connectors are arranged in a row between the first outer wall and the second outer wall.

Preferably, the optical connectors are arranged next to one another, especially directly adjacent to one another within the fiber optic module.

The optical connectors can also be arranged on top of each other within the fiber optic module. Thus, the optical connectors can also be arranged in one or more vertical layers/tiers in the fiber optic module, preferably in two, three, or four vertical layers (or even more vertical layers) in the fiber optic module.

For instance, between two and ninety-six optical connectors, preferably between four and thirty-two optical connectors, for example also between eight and twenty-four optical connectors, can be arranged in the fiber optic module. In general, it is also possible that only a single optical connector is arranged in the fiber optic module. However, preferably one or more optical connectors are arranged in a common fiber optic module.

For example, one fiber optic module may distribute one to thirty-two (or even more) optical inner conductors, preferably two to twenty-four optical inner conductors, most preferably eight to twenty-four optical inner conductors, e. g., exactly eight, twelve, sixteen or twenty-four optical inner conductors, from the optical connectors at the frontside of the fiber optic module (each optical connector comprises preferably one or two of the inner conductors) to a common optical connector at the backside of the fiber optic module.

A patch panel according to the invention may comprise an arbitrary number of modules with an arbitrary number of optical connectors/optical inner conductors. Preferably, 48 to 240 (or even more) optical inner conductors may be comprised in one single height unit of the patch panel, most preferably 96 to 196 optical inner conductors, e. g., exactly 96, 144 or 196 optical inner conductors.

According to an advantageous embodiment of the invention, the first rail profile and the second rail profile are aligned along a plug-in direction of the at least one optical connector. The longitudinal axis of the rail profiles is most preferably aligned parallel to the plug-in direction.

Thus, it may be possible to slide-in the fiber optic modules from a frontside of the patch panel which may be most comfortable for the operator.

However, it may also be possible that the first rail profile and the second rail profile are aligned angled, preferably orthogonal, to the plug-in direction of the at least one optical connector.

According to one embodiment of the invention, the shape of the first rail profile and the shape of the second rail profile are identical. Preferably, the second rail profile is rotated by an angle of 180° (around its longitudinal axis) relative to the first rail profile.

The manufacturing process of the fiber optic modules may be simplified if both rail profiles are identical. Thus, the cost-efficiency of the fiber optic module manufacturing process can be improved.

Especially when using identical rail profiles which are rotated by an angle of 180° around their longitudinal axis relative to each other, the fiber optic module may be coupled to an adjacent fiber optic module (with a corresponding rail configuration) independent of the mutual orientation of the fiber optic modules—the adjacent fiber optic module may even be flipped upside down or mounted inversely to the fiber optic module. Thus, the flexibility how to attach fiber optic modules to each other can be further improved.

However, the invention shall not be limited to identical shapes of the rail profiles; the shape of the first rail profile and the shape of the second rail profile may also be different. For example, one of the rail profiles may be designed as single protrusion and the other rail profile as corresponding recession/deepening.

According to one embodiment of the invention, each rail profile is composed of at least one uniform profile shape. Most preferably, each rail profile is composed of at least two uniform profile shapes which are arranged on top of each other. Thus, the rail profiles may be built as a stack of identical uniform portions/geometric shapes. The step sizes/heights of each uniform profile shape may be identical.

By reusing common parts, (e. g., uniform profile shapes), the production process can be further improved.

Each uniform rail profile shape can be composed of a protrusion and a corresponding recession which are arranged on top of each other. Preferably, the recession corresponds to the negative form of the protrusion.

By using uniform rail profile shapes, different fiber optic modules with different sizes, especially different heights and/or widths, can be attached/stacked onto each other easily. Preferably, the rail profiles are composed of uniform patterns with a specific step size. The pattern may be continued by stacking the fiber optic modules or by extending the modules in increments of this step size which is the height of the uniform rail profile shape.

The corresponding rail profiles may always fit into each other independent of the heights of the adjacent fiber optic modules. Despite the different partitioning, all fiber optic modules with a respective rail configuration of the same uniform profile shape shall be compatible to each other. Subsequently, changes in the configuration of the optical patch panel are easily possible.

In a preferred embodiment, each rail profile is designed such that the fiber optic module and the adjacent fiber optic module may be coupled in a form-fitting connection in two directions orthogonal to a longitudinal axis of the rail profiles.

Most preferably, the rail profiles are designed such that the modules are only movable along the longitudinal axis of the rail profiles. Thus, the rail profiles may block rotational and/or translational movements of the modules relative to each other except a translational movement along the longitudinal axis of the rail profiles.

In a preferred embodiment, each rail profile is composed of at least one half-dovetail protrusion and at least one corresponding half-dovetail recession which are arranged on top of each other.

In another embodiment, each rail profile is composed of at least one dovetail protrusion and at least one corresponding dovetail recession which are arranged on top of each other.

In yet another embodiment, each rail profile is composed of at least one rectangular protrusion and at least one corresponding rectangular recession which are arranged on top of each other.

In general, even more rail profile compositions/configurations can be possible, e. g., triangular recessions and protrusions, cylindrical recessions and protrusions, radial recessions and protrusions, crescent recessions and protrusions, T-form recessions and protrusions, and so on.

Both, the embodiment with the half-dovetail profiles and the full-dovetail profiles are beneficial to eliminate movement of the modules relative to one another orthogonal to the insertion direction. Thus, the attached fiber optic modules may form a stable row which can be handled in composition. The embodiment with the full-dovetail or half-dovetail makes it possible to keep the fiber optic modules engaged in their attached state even if the patch panel is not fully equipped. However, in some cases also a version of the rail profile with the possibility of lateral displacement (as is the case for the rectangular-based profile) may be suitable.

Although the stability of the full-dovetail version of the rail profile might be best, the half-dovetail version may still be the preferred embodiment as the total height of uniform profile shapes based on half-dovetail protrusions and recessions can be smaller. Another advantage of the half-dovetail structure over the full-dovetail shape may be that mechanical tolerances can be matched easier when interlocking the fiber optic modules. The manufacturing process can therefore be less demanding for the half-dovetail profiles.

According to one embodiment of the invention, the fiber optic module may comprise at least one snap-in locking device for fixing the fiber optic module to the adjacent fiber optic module when the fiber optic modules are coupled to each other.

Also the patch panel, or a chassis of the patch panel, may comprise a snap-in locking device for fixing at least the outermost modules of a fiber optic module kit to the patch panel/the chassis. All features of the snap-in locking device of the fiber optic modules, which will be described herein, can readily also be applied to the snap-in locking device of the patch panel/the chassis of the patch panel.

Locking may take place as soon as the modules are moved to their intended position relative to one another. Thereby, the modules can easily be inserted or removed individually or even in groups/compositions.

According to a preferred embodiment of the snap-in locking device, the snap-in locking device comprises a spring-loaded locking arm. Preferably, the locking arm protrudes from one of the outer walls in extension of the longitudinal axis of the outer wall.

Each locking arm may include at least one mounting/clamping tap and at least one mounting rail. The taps and rails may be arranged on top of each other.

Preferably, the design of the locking arms on the first outer wall and the second outer wall are identical, wherein the locking arm of the second outer wall is rotated by an angle of 180° relative to the locking arm of the first outer wall. Thus, it is still possible to use common parts during the manufacturing process of the fiber optic modules.

To release an individual module or a group of modules, (the handles of) the respective locking arms can be pressed.

In another embodiment, the snap-in locking device comprises a latching cavity in one of the two rail profiles and an associated latch spring in the other rail profile.

Thus, fixation and alignment of the fiber optic modules can be achieved as soon as the latch spring of one of the profiles extends into the latching cavity of the corresponding profile. Latching can be initiated by a translational movement of the fiber optic modules relative to each other.

The invention also relates to a fiber optic module kit for installation within a patch panel, comprising at least two fiber optic modules, preferably at least two fiber optic modules. The fiber optic modules are coupled in a row via the rail profiles of adjacent fiber optic modules.

The invention allows for attaching and stacking of modules without any additional rail structures as the rail structures are already included in the modules.

In general, the fiber optic module kit may contain an arbitrary number of fiber optic modules, e.g., two to thirty modules or even more modules.

In one embodiment, at least two of the fiber optic modules differ in size, arrangement of optical connectors, number of optical connectors, and/or type of optical connectors.

It is an advantage of the proposed fiber optic module kit that especially modules of different sizes/geometries may be freely combined. Modules may be inserted and removed individually or as group of modules from the fiber optic module kit.

The invention also relates to an optical patch panel for installation in a distribution frame ("rack"), the optical patch panel comprising at least one fiber optic module kit, preferably at least one fiber optic module kit according to the present description. The optical patch panel further comprises a chassis for receiving the at least one fiber optic module kit and for mounting the optical patch panel into the distribution frame. The chassis can be designed such that the fiber optic module kit can be inserted from a frontside interface and/or from a backside interface.

The optical patch panel may be used for a distribution frame in a data center.

As guide rails and optional locking mechanisms may be part of the fiber optic modules themselves, the invention allows for space savings compared to fiber optic modules of the prior art. The density of optical connectors per optical patch panel can be increased significantly.

The costs for fixing and guiding the modules on the optical patch panel can be minimized. A complex chassis-tray-structure can be avoided, according to the core idea of the invention to fix neighboring modules to each other.

The proposed optical patch panel provides highest flexibility for arbitrary fiber optic module arrangements. There is no need to modify the optical patch panel when changing partitioning.

The chassis of the optical patch panel may comprise mating rail profiles corresponding to the rail profiles of the fiber optic modules, at least corresponding to the rail profiles of outermost fiber optic modules of the fiber optic module kit in order to couple the fiber optic module kit to the optical patch panel/the chassis. The mating rail profiles may be arranged opposite to each other on the inner surfaces of side walls of the chassis and/or opposite to each other on the inner surfaces of a bottom cover and a top cover of the chassis.

The optical patch panel may comprise a mounting frame or other means (e.g., brackets) for mounting the optical patch panel to the distribution frame. However, in particular cases the chassis may also be mounted directly to the distribution frame (without using a mounting frame at all).

In one embodiment of the invention, the optical patch panel comprises barrier features being arranged inside the chassis for limiting the insertion depth of at least one of the fiber optic modules of the at least one fiber optic module kit. The barrier features are preferably arranged in a uniform pattern, e.g., in a comb-like pattern. Thus, the barrier features may realize an end position for the fiber optic modules inside the optical patch panel and/or inside the chassis of the optical patch panel, so that the modules cannot be pushed inside any further. Additionally, the assembly can be mechanically stabilized.

The arrangement in a uniform pattern, e.g., the comb-like pattern, makes it possible to use the barrier features with any possible combination of modules.

According to an advantageous embodiment of the invention, the barrier features, the fiber optic module kit, and/or at least one of the fiber optic modules is designed to latch the fiber optic module kit, or the at least one fiber optic module, to at least one of the barrier features when the fiber optic module kit and/or the at least one fiber optic module is fully inserted into the chassis.

Each fiber optic module may be equipped with a latching element, (e.g., a spring clamp) for snapping into the barrier feature. The fiber optic module can be released when a pulling/drawing force on the module overcomes the spring force.

In addition to the aforementioned fiber optic module with its optical connectors, also fiber optic modules without optical connectors may be included into the fiber optic module kit/into the patch panel, especially dummy modules (placeholders). Moreover, a fiber optic module may also include specific functionalities, e. g., multiplexing and/or data processing.

In general, it is possible to attach adjacent modules to each other having different orientations. However, the fiber optic modules and/or the rail profiles may include mechanical keying to exclude unattended orientations or combinations of fiber optic modules. Such mechanical keying may—for example only, and without limitation, —be realized by a specific arrangement of pins and corresponding notches/grooves. Also magnetic coding to enable for designated orientations and combinations of modules and to prevent unwanted orientations and combinations of modules can be implemented.

The invention also relates to a distribution frame for a data center. The distribution frame comprises at least one optical patch panel of a first type, according to the before mentioned optical patch panel.

Preferably, the distribution frame is an industrial standard 19 inch rack.

The distribution frame may comprise multiple slots in different vertical layers/tiers for the insertion of the optical patch panels.

Features that have already been described in connection with the fiber optic module can also readily be applied to the fiber optic module kit, the optical patch panel, or the distribution frame—and vice versa.

Terms such as "comprising", "having" or "employing" do not exclude further features. Furthermore, it is mentioned that terms as "a" or "the", suggesting a single feature, are not meant to exclude a plurality of such features.

Embodiments of the invention will be described in more detail below with reference to the accompanying Figures.

The Figures show preferred embodiments in which individual features of the present invention are illustrated in combination with one another. Features of one embodiment can also be implemented in a manner detached from the other features of the same embodiment and can readily combined by a person skilled in the art with features of other embodiments to form further expedient combinations and sub-combinations.

Functionally identical elements are provided with the same reference symbols in the accompanying Figures.

SUMMARY

A principal aspect of the present invention is a fiber optic module (10) for installation within a patch panel (1), the fiber optic module (10) comprising a first outer wall (12) with a first rail profile (13) on its outside surface, a second outer wall (14) with a second rail profile (15) on its outside surface, and at least one optical connector (11), wherein the first outer wall (12) and the second outer wall (14) run parallel to each other, and wherein the at least one optical connector (11) is arranged between the first outer wall (12) and the second outer wall (14), characterized in that the first rail profile (13) and the second rail profile (15) are complementary to each other such that the fiber optic module (10) may be coupled to an adjacent fiber optic module (10), wherein the first rail profile (13) of the fiber optic module (10) may be coupled to the second rail profile (15) of the adjacent fiber optic module (10).

A further aspect of the present invention is a fiber optic module (10), characterized in that the first outer wall (12) is a first side wall and the second outer wall (14) is a second side wall.

A further aspect of the present invention is a fiber optic module (10), characterized in that two or more optical connectors (11) are arranged in a row between the first outer wall (12) and the second outer wall (14).

A further aspect of the present invention is a fiber optic module (10), characterized in that the first rail profile (13) and the second rail profile (15) are aligned along a plug-in direction (x) of the at least one optical connector (11).

A further aspect of the present invention is a fiber optic module (10), characterized in that the shape of the first rail profile (13) and the shape of the second rail profile (15) are identical, wherein the second rail profile (15) is rotated by an angle of 180° relative to the first rail profile (13).

A further aspect of the present invention is a fiber optic module (10), characterized in that each rail profile (13, 15) is composed of one or more identical uniform profile shapes (18) with equal step size which are arranged on top of each other, wherein each uniform profile shape (18) is composed of a protrusion (19, 21, 23) and a corresponding recession (20, 22, 24) which are arranged on top of each other.

A further aspect of the present invention is a fiber optic module (10), characterized in that each rail profile (13, 15) is designed such that the fiber optic module (10) and the adjacent fiber optic module (10) may be coupled in a form-fitting connection in two directions orthogonal to a longitudinal axis of the rail profiles (13, 15).

A further aspect of the present invention is a fiber optic module (10), characterized by at least one snap-in locking device (25) for fixing the fiber optic module (10) to the adjacent fiber optic module (10) when the fiber optic modules (10) are coupled to each other.

A further aspect of the present invention is a fiber optic module (10), characterized in that the snap-in locking device (25) comprises a spring-loaded locking arm (26) which protrudes from one of the outer walls (12, 14) in extension of the longitudinal axis of the outer wall (12, 14).

A further aspect of the present invention is a fiber optic module (10), characterized in that the snap-in locking device (25) comprises a latching cavity (30) in one of the two rail profiles (13, 15) and an associated latch spring (31) in the other rail profile (15, 13).

A further aspect of the present invention is a fiber optic module kit (9) for installation within a patch panel (1), comprising at least two fiber optic modules (10) according to one of the claims 1 to 10, wherein the fiber optic modules (10) are coupled in a row via the rail profiles (13, 15) of adjacent fiber optic modules (10).

A further aspect of the present invention is a fiber optic module kit (9), characterized in that at least two of the fiber optic modules (10) differ in size, arrangement of optical connectors (11), number of optical connectors (11), and/or type of optical connectors (11).

A further aspect of the present invention is an optical patch panel (1) for installation in a distribution frame, the patch panel (1) comprising at least one fiber optic module kit (9) and a chassis (2) for receiving the at least one fiber optic module kit (9) and for mounting the patch panel (1) into the distribution frame.

A still further aspect of the present invention is an optical patch panel (1), characterized by barrier features (32) arranged inside the chassis (2) for limiting the insertion depth of at least one of the fiber optic modules (10) of the at least one fiber optic module kit (9), wherein the barrier features (32) are preferably arranged in a uniform, comb-like pattern.

An even still further aspect of the present invention is an optical patch panel (1), characterized in that the barrier features (32), the fiber optic module kit (9), and/or at least one of the fiber optic modules (10) is designed to latch the fiber optic module kit (9) or the at least one fiber optic module (10) to at least one of the barrier features (32) when the fiber optic module kit (9) and/or the at least one fiber optic module (10) is fully inserted into the chassis (2).

These and other aspects of the present invention will be fully disclosed in more detail, as is required by the statutes, herein.

BRIEF DESCRIPTIONS OF THE FIGURES

The Figures show schematically:

DETAILED DESCRIPTION OF THE PREFERRED EMBODIMENTS

This disclosure of the invention is submitted in furtherance of the Constitutional purposes of the US Patent Laws "to promote the progress of science and useful arts" (Article 1, Section 8).

Figure 1:
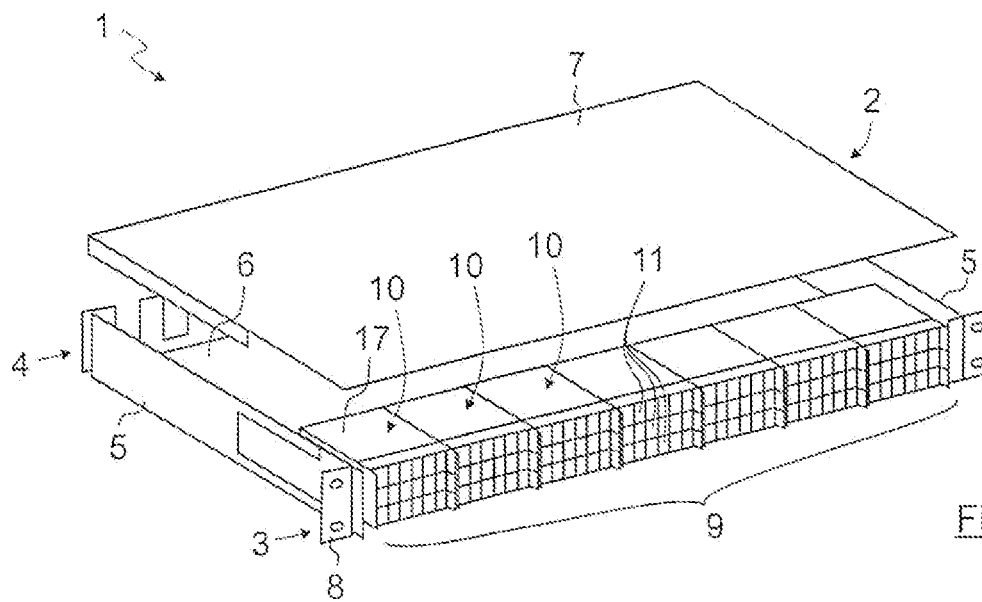
FIG. 1 is a perspective view of a patch panel according to one embodiment of the invention.

FIG. 1 shows an optical patch panel 1 for installation in a distribution frame (not shown). The optical patch panel 1 comprises a chassis 2 with a frontside interface 3 and a backside interface 4. The chassis 2 further comprises spaced apart side walls 5, a bottom cover 6 supporting the frontside interface 3, the backside interface 4 and the side walls 5, and an optional top cover 7. The patch panel 1 also comprises mounting frames 8 for mounting the optical patch panel 1 to the distribution frame. However, the chassis 2 of the optical patch panel 1 can also be attached to the distribution frame directly without any mounting frame 8.

The optical patch panel 1 further comprises at least one fiber optic module kit 9 which can be received in the chassis 2, preferably from the frontside interface 3.

Figure 8:
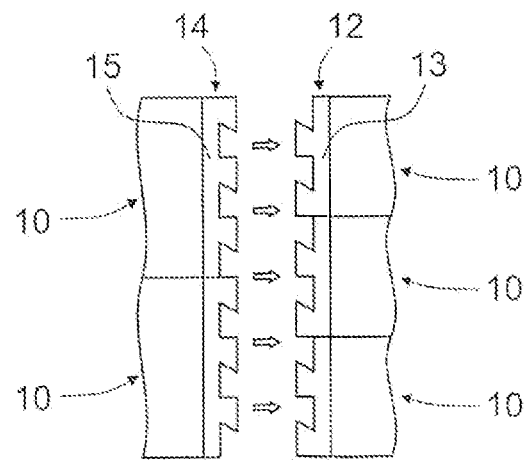
FIG. 8 is an orthographic view of an example on how to attach fiber optic modules with different heights via stacks of uniform rail profiles of FIG. 5.
Figure 9:
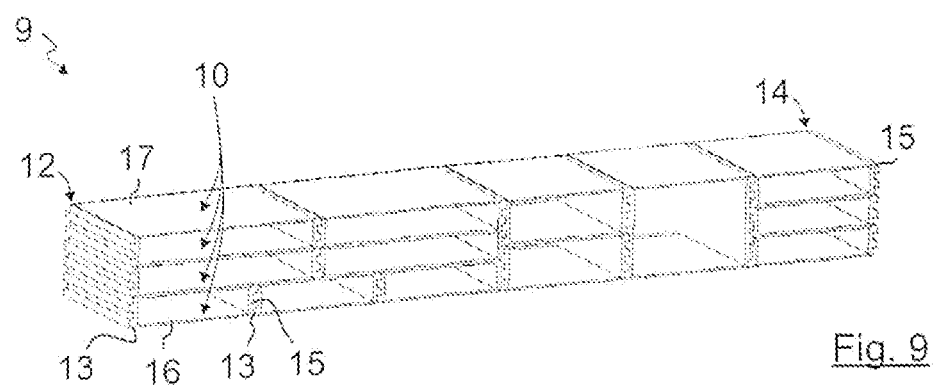
FIG. 9 is a perspective view of a fiber optic module kit with fiber optic modules differing in size.
Figure 10:
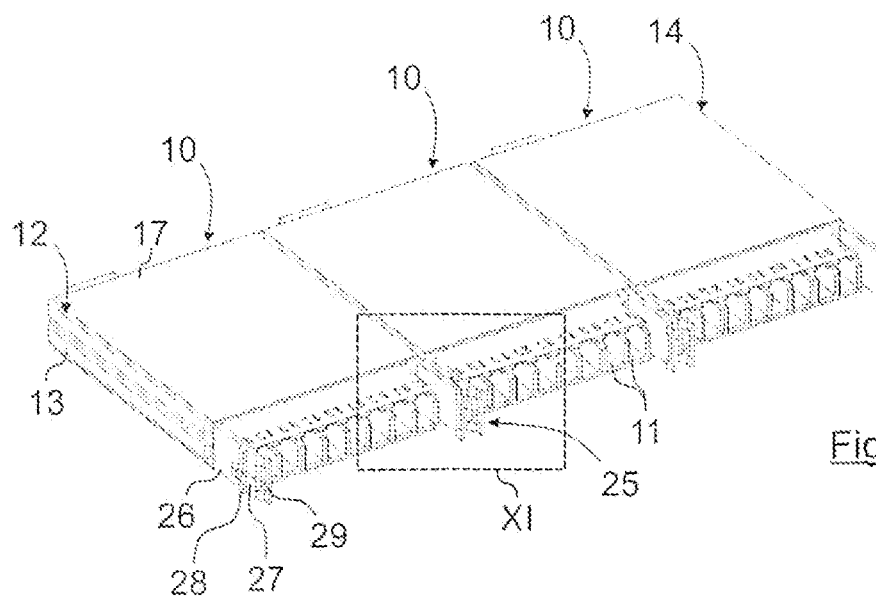
FIG. 10 is a perspective view of three fiber optic modules, comprising snap-in locking devices according to a first embodiment with spring-loaded locking arms.

The fiber optic module kit 9 for installation within the optical patch panel 1 comprises at least two fiber optic modules 10 wherein the fiber optic modules 10 are directly coupled to each other/one another in a row. The fiber optic modules 10 of the fiber optic module kit 9 may also be coupled on top of each other/one another in order to form a stack of fiber optic modules 10 (c. f., FIGS. 8 and 9).

In the application example of FIG. 1, the fiber optic module kit 9 exemplarily comprises seven fiber optic modules 10 being attached to each other in a row. However, a fiber optic module kit 9 may comprise an arbitrary number of fiber optic modules 10 in arbitrary configuration. The fiber optic modules 10 of a fiber optic module kit 9 may differ in size, arrangement of optical connectors 11, number of optical connectors 1, and/or type of optical connectors 11.

Figure 2:
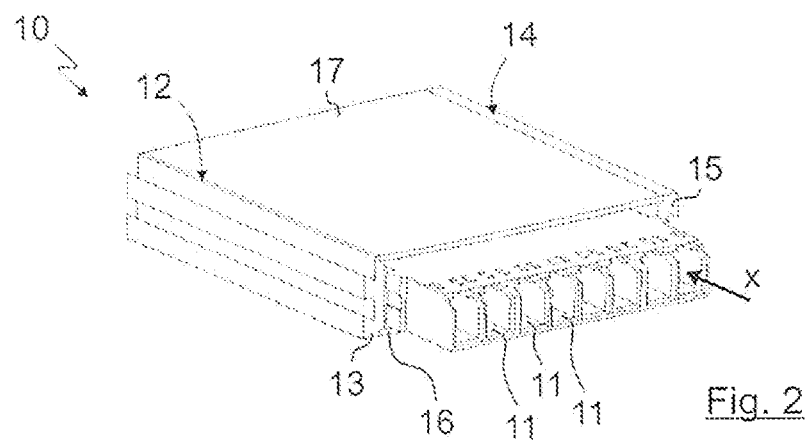
FIG. 2 is a perspective view of a fiber optic module according to one embodiment of the invention.

FIG. 2 shows an individual fiber optic module 10 for installation within an optical patch panel 1 or within a fiber optic module kit 9. The fiber optic module 10 comprises a first outer wall 12 with a first rail profile 13 on its outside surface, a second outer wall 14 with a second rail profile 15 on its outside surface and optical connectors 11 between the first outer wall 12 and the second outer wall 14.

In the application examples, the optical connectors 11 are designed as socket connectors to receive a plug connector, e. g., a plug connector of an optical cable (not shown). However, the optical connectors 11 may also be designed as plug connectors for receiving socket connectors. The invention is not limited to a specific type of connector 11.

As shown in FIG. 2, eight optical connectors 11 are arranged between the first outer wall 12 and the second outer wall 14. However, according to the invention, an arbitrary number of optical connectors 11 may be arranged between the first outer wall 12 and the second outer wall 14. The optical connectors 11 can be arranged in a single row, as shown in FIG. 2, but may also be arranged in stacks and rows, e. g., as shown in FIG. 1.

Figure 3:
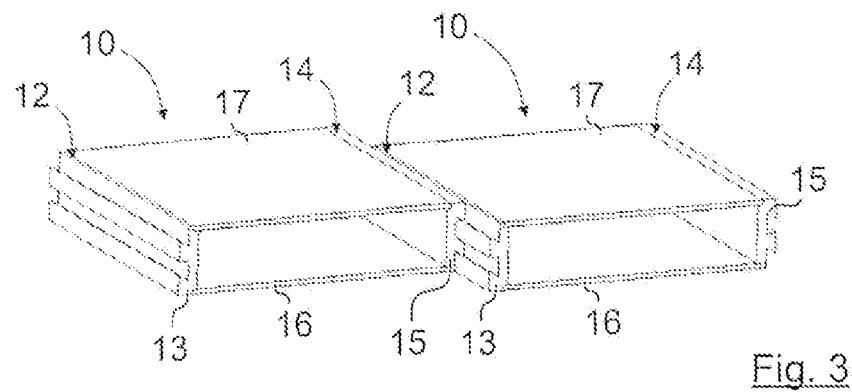
FIG. 3 is a perspective view of the fiber optic module of FIG. 2 attached to an adjacent fiber optic module with a corresponding rail configuration in a without the optical connectors.

The first rail profile 13, and the second rail profile 15, form a common rail configuration, wherein the first outer wall 12 and the second outer wall 14 extend parallel to each other/one another. The first rail profile 13 and the second rail profile 15 are designed complementarily to each other such that the fiber optic module 10 may be coupled to an adjacent fiber optic module 10 having a corresponding rail configuration, wherein the first rail profile 13 of the fiber optic module 10 may be coupled to a second rail profile 15 of the adjacent fiber optic module 10. To show the principle of the proposed rail profile configuration, FIGS. 3 and 4 exemplarily show a fiber optic module 10 and an adjacent fiber optic module 10 in a (partly) attached state. For simplification, the optical connectors 11 of the optic modules 10 are not shown in FIGS. 3 and 4 and some later Figures.

The first outer wall 12 is a first side wall and the second outer wall 14 is a second side wall. However, in specific cases, the first outer wall 12 may also be a base plate 16 and the second outer wall 14 a cover plate 17 of the fiber optic module 10. Thus, the fiber optic modules 10 could also be guided on top of each other/one another.

The first rail profile 13 and the second rail profile 15 are aligned along a plug-in direction x of the at least one optical connector 11 (c. f., FIG. 2). However, the first rail profile 13 and the second rail profile 15 may also be aligned in an angle, especially orthogonal to the plug-in direction x.

Figure 4:
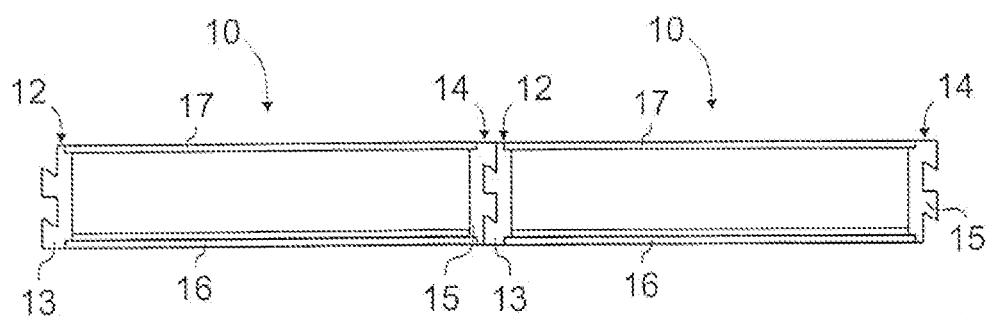
FIG. 4 is an orthographic front view of the fiber optic modules of FIG. 3.

Preferably, as shown in the application examples, the shape of the first rail profile 13 and the shape of the second rail profile 15 are identical, wherein the second rail profile 15 is rotated by an angle of 180° relative to the first rail profile 13 (c.f., FIG. 4).

Figure 5:
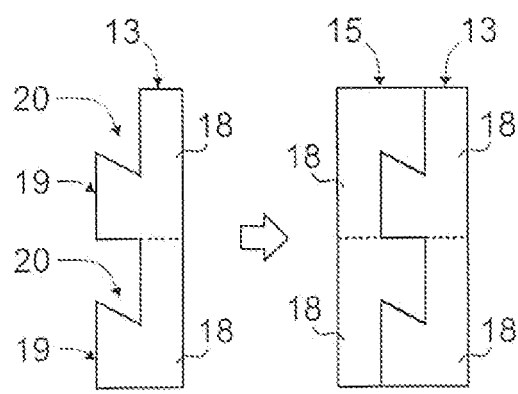
FIG. 5 is an enlarged view of the rail profiles of the fiber optic modules of FIGS. 2-4, composed of uniform profile shapes based on half-dovetail protrusions and half-dovetail recessions.
Figure 6:
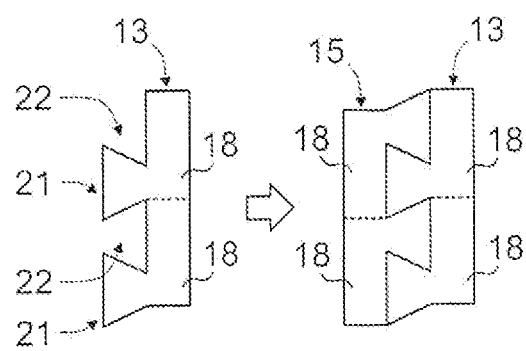
FIG. 6 is an enlarged view of an alternative rail profile, composed of uniform profile shapes based on dovetail protrusions and dovetail recessions.
Figure 7:
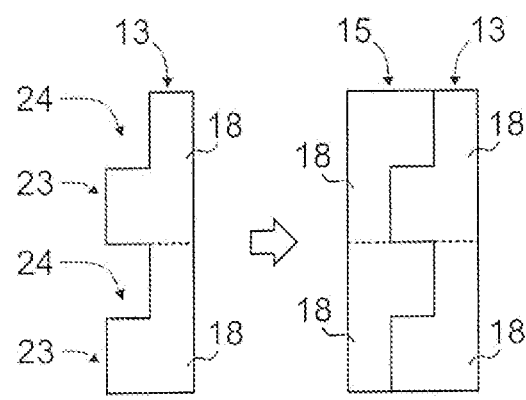
FIG. 7 is an enlarged view of an alternative rail profile, composed of uniform profile shapes based on rectangular protrusions and rectangular recessions.

It can be beneficial to build the rail profiles from uniform profile shapes 18, most preferably from at least two identical uniform profile shapes 18 with equal step size which are arranged on top of each other. Each uniform profile shape 18 may comprise a protrusion and a corresponding recession (preferably the negative form of the protrusion) which are arranged on top of each other. In FIGS. 5 to 7 different uniform profile shapes 18 are exemplarily shown.

In the preferred embodiment of FIG. 5, each uniform rail profile 18 is composed of at least one half-dovetail protrusion 19 and at least one corresponding half-dovetail recession 20 which are arranged on top of each other. By stacking such uniform rail profile shapes 18, fiber optic modules 10 of different sizes, especially heights and widths, may be attached to each other most easily, as exemplarily shown in FIGS. 8 and 9.

Although the half-dovetail uniform rail profile shapes 18 are preferred, different types of uniform profile shapes 18 may also be beneficial, depending on the application. For example, FIG. 6 shows a uniform rail profile shape 18 which is composed of at least one dovetail protrusion 21 and at least one corresponding dovetail recession 22 which are arranged on top of each other.

Both—the half-dovetail and the full-dovetail version of the uniform rail profile shape 18—may block a lateral displacement of the fiber optic modules 10 in their attached state. Thus, it is possible to keep the fiber optic modules 10 safe in place although the optical patch panel 1 is not fully equipped.

FIG. 7 shows a simplified version of the invention with uniform rail profile shapes 18 being composed of at least one rectangular protrusion 23 and at least one corresponding rectangular recession 24 which are arranged on top of each other. Although such rail profiles cannot securely hold adjacent fiber optic modules 10 in place in case of a not fully equipped optical patch panel 1, the uniform rail profile shapes 18 of FIG. 7 may still be preferred in specific cases due to their simple design.

The fiber optic modules 10 may comprise at least one snap-in locking device 25 for fixing fiber optic modules 10 to adjacent fiber optic modules 10 when the fiber optic modules 10 are coupled to each other. FIGS. 10 to 15 show a first embodiment of an advantageous snap-in locking device 25. FIGS. 16 to 19 illustrate another possible snap-in locking device 25.

Figure 11:
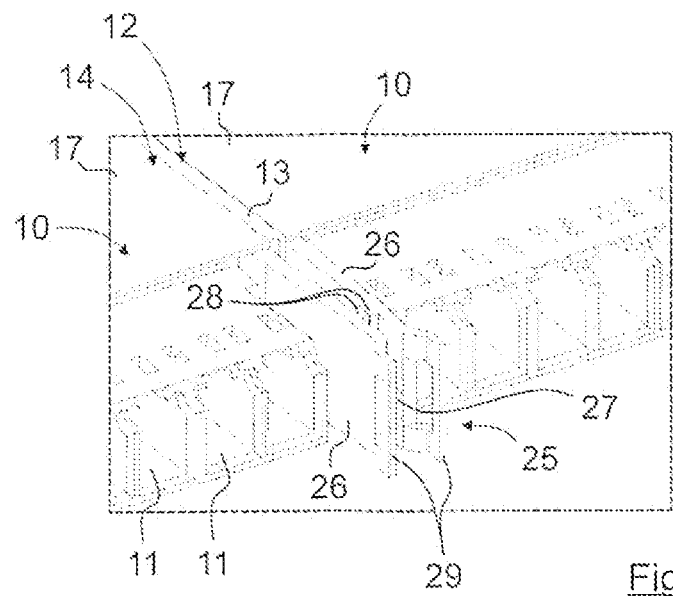
FIG. 11 is an enlarged view of section XI of FIG. 10.

According to the preferred embodiment of the snap-in locking device 25, the snap-in locking device 25 comprises a spring-loaded locking arm 26 which protrudes from a respective outer wall 12, 14 in extension of the outer wall 12, 14 (best shown in FIG. 11).

Figure 12:
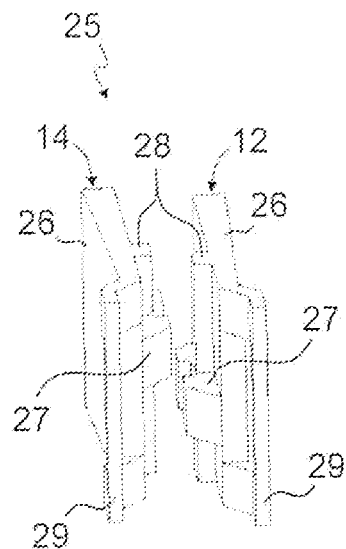
FIG. 12 is a perspective view of two corresponding locking arms of FIG. 10.
Figure 13:
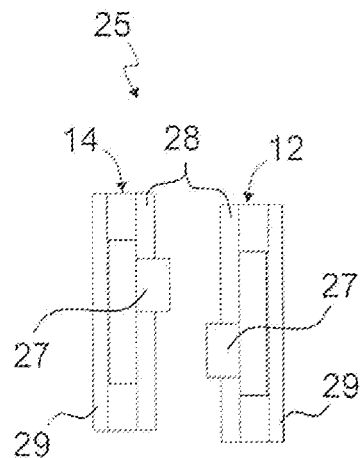
FIG. 13 is an orthographic front view of the two locking arms of FIG. 12.

As can be seen best in FIG. 12, each locking arm 26 comprises a clamping tap 27 and a vertical rail 28. By moving one optical module 10 along the rail guide of its counterpart, the clamping taps 27 and rails 28 of the respective rail profile 13, 15 will be opposed to each other at a certain position. As the locking arms 26 are laterally prestressed, the clamping taps 27 snap into the rail 28 of the adjacent locking arm 26. As for the rail profiles 13, 15, also the locking device 25 may be designed symmetrically to maintain the possibility of using common parts. Thus, the locking arm 26 at the second outer wall 14 may be rotated by an angle of 180° relative to the locking arm 26 of the first outer wall 12 (c.f., FIG. 13).

Figure 14:
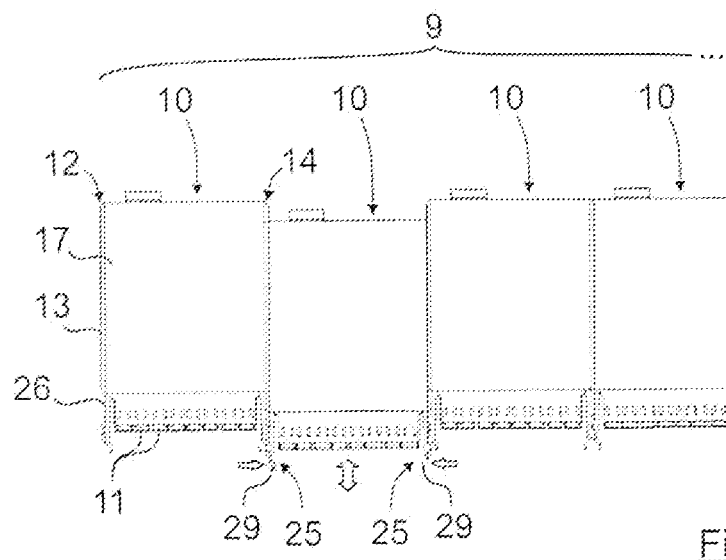
FIG. 14 is an orthographic top, downwardly looking view of an example on how to remove a single fiber optic module out of a fiber optic module kit by actuating the respective locking arms.
Figure 15:
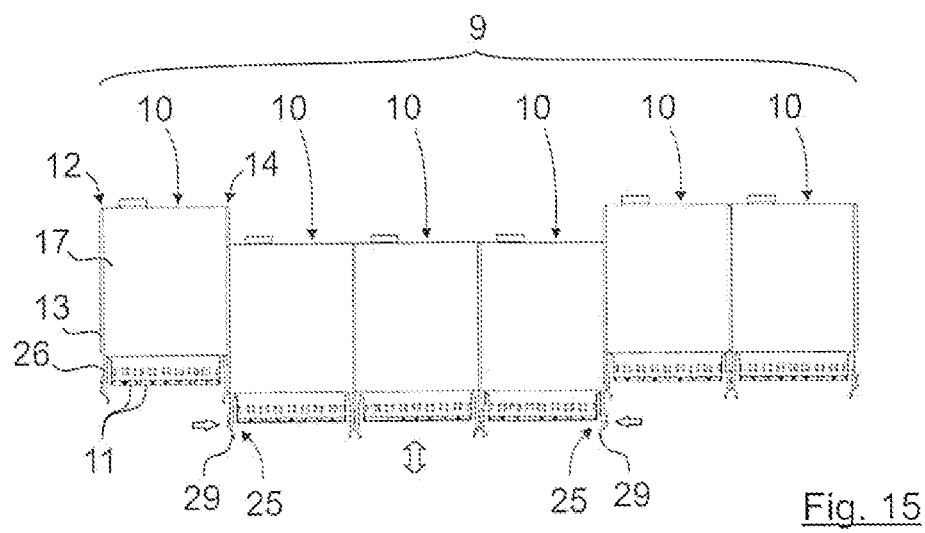
FIG. 15 is an orthographic top, downwardly looking view of an example on how to remove a group of fiber optic modules out of a fiber optic module kit by actuating the respective locking arms.
Figure 16:
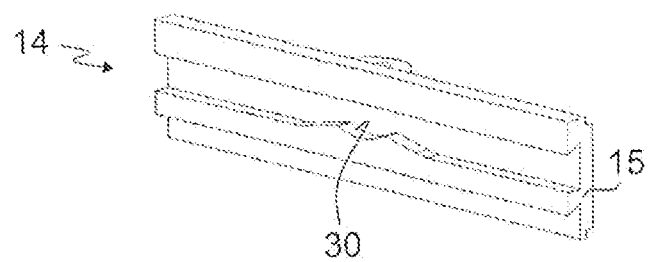
FIG. 16 is a perspective view of an adopted rail profile with a latching cavity to realize a second embodiment of a snap-in locking device.
Figure 17:
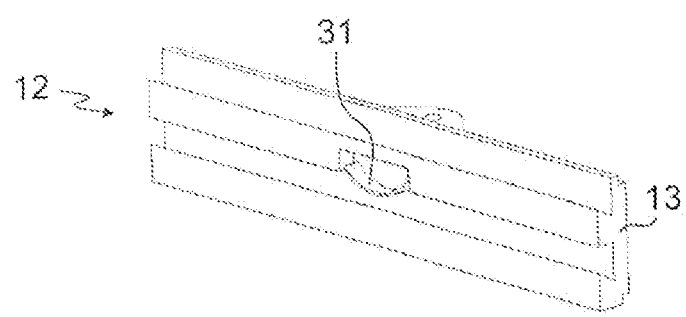
FIG. 17 is a perspective view of an adopted rail profile with a latch spring to realize the second embodiment of the snap-in locking device.
Figure 18:
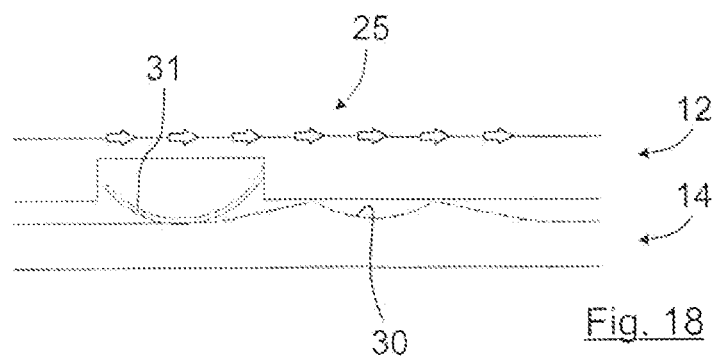
FIG. 18 is an enlarged orthographic side view of the second embodiment of the locking device in an unattached state.
Figure 19:
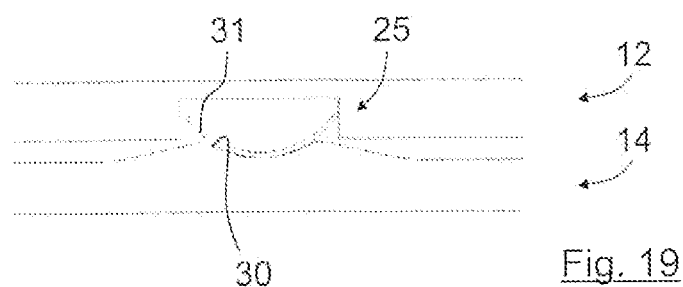
FIG. 19 is an enlarged orthographic side view of the second embodiment of the locking device in an attached state.

To release a fiber optic module 10, the handles 29 of the respective locking arms 26 can be pressed. The handles 29 can be curved at an outermost section to provide a better access and better grip. As shown in FIGS. 14 and 15, individual fiber optic modules 10 can be removed as well as a group of fiber optic modules 10 by simply pressing the respective outermost handles 29 of the locking arms 26.

In another embodiment of the snap-in locking device 25, the snap-in locking device 25 comprises a latching cavity 30 in one of the two rail profiles 13, 15 and an associated latch spring 31 in the other rail profile 15, 13. In this case, each fiber optic module 10 requires two distinguished profiles 13, 15. Therefore, no common parts can be used when this specific snap-in locking device 25 shall be implemented. Fixation and alignment of the fiber optic modules 10 can be achieved as soon as the spring 31 of one rail profile 13, 15 extends into the cavity 30 of its corresponding rail profile 15, 13. This can automatically be initiated by the guided translational movement of the two fiber optic modules 10 relative to each other (c.f., arrows in FIGS. 18 and 19).

Figure 20:
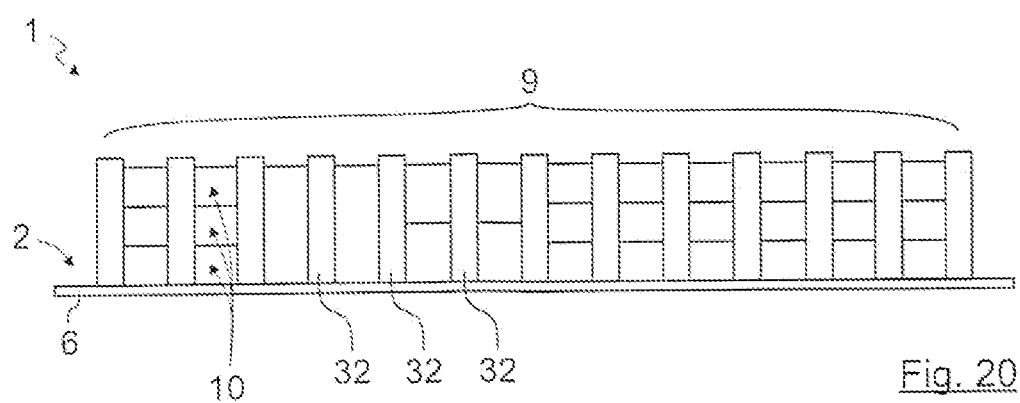
FIG. 20 shows the barrier features for the fiber optic modules arranged inside the chassis in a comb-like pattern.

It can be beneficial to implement barrier features 32 in the optical patch panel 1, as will be described with respect to FIGS. 20 to 22.

The barrier features 32 can be arranged inside the chassis 2 for limiting the insertion depth of at least one of the fiber optic modules 10 of the at least one fiber optic module kit 9. The barrier features 32 are preferably arranged in a rectangular, comb-like pattern, as shown in FIG. 20. The pattern/distance in between the barrier features 32 may be selected in order to ensure arbitrary partitioning and combination of fiber optic modules 10.

Optionally, the barrier features 32, the fiber optic module kit 9, and/or at least one of the fiber optic modules 10 can be designed to latch the fiber optic module kit 9 or the at least one fiber optic module 10 to at least one of the barrier features 32 when the fiber optic module kit 9 and/or the at least one fiber optic module 10 is fully inserted into the chassis 2.

Figure 21:
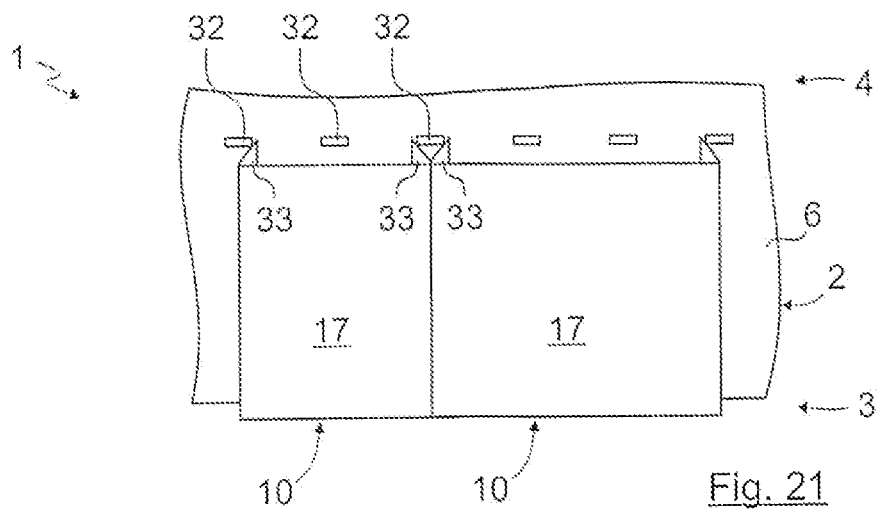
FIG. 21 is an orthographic top view of one possibility on how to latch fiber optic modules to the barrier features.
Figure 22:
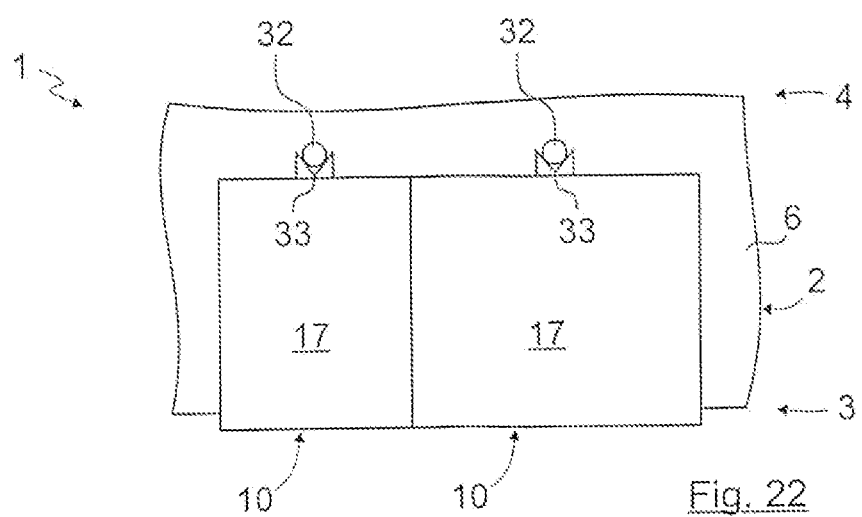
FIG. 22 is an orthographic view of another possibility on how to latch fiber optic modules to the barrier features.

As shown in FIG. 21, each fiber optic module 10 can be equipped with a latching element 33, e. g., a spring clamp, for snapping into the barrier feature 32. The fiber optic modules 10 can be released when a pulling/drawing force overcomes the spring force.

FIG. 21 shows one embodiment of the latch implementation wherein the latching elements 33 are integrated into the outer walls 12, 14 of the individual fiber optic modules 10. FIG. 22 shows another implementation, wherein the latching elements 33 are implemented on the backside of the fiber optic modules 10.

While the invention has been described with reference to various preferred embodiments, it should be understood by those skilled in the art that various changes may be made and equivalents substituted for elements thereof without departing from the scope of the invention. In addition, many modifications may be made to adapt to a particular situation or application of the invention without departing from the scope of the invention. Therefore, it is intended that the invention not be limited to the particular embodiments disclosed but rather, that the invention will include all embodiments falling within the scope of the appended claims.

OPERATION

Having thus described the structure of our Fiber Optic Module, Fiber Optic Module Kit and Optical Patch Panel its operation is briefly described.

A principal object of the present invention is a fiber optic module (10) for installation within a patch panel (1), the fiber optic module (10) comprising: a first outer wall (12) having a first rail profile (13) on an outside surface of the first outer wall (12); a second outer wall (14) having a second rail profile (15) on an outside surface of the second outer wall (14); and an optical connector (11), between the first outer wall (12) and the second outer wall (14); and wherein the first outer wall (12) and the second outer wall (14) are oriented parallel to one another; and wherein the first rail profile (13) and the second rail profile (15) are complementary to each other so that the fiber optic module (10) may be coupled to an adjacent fiber optic module (10), and wherein the first rail profile (13) of the fiber optic module (10) may be coupled to a second rail profile (15) of the adjacent fiber optic module (10).

A further object of the present invention is a fiber optic module (10) wherein the first outer wall (12) is a first side wall; and the second outer wall (14) is a second side wall.

A further object of the present invention is a fiber optic module (10) and further comprising: plural optical connectors (11) between the first outer wall (12) and the second outer wall (14).

A further object of the present invention is a fiber optic module (10) wherein the first rail profile (13) and the second rail profile (15) are aligned along a plug-in direction (x) of the optical connector (11).

A further object of the present invention is a fiber optic module (10) wherein a shape of the first rail profile (13) and a shape of the second rail profile (15) are identical, and wherein the second rail profile (15) is rotated by an angle of 180° relative to the first rail profile (13).

A further object of the present invention is a fiber optic module (10) wherein each of the first and second rail profiles has (13, 15) one or more identical uniform profile shapes (18) with each identical uniform profile shape having an equal step size which are arranged on top of one another; and wherein each identical uniform profile shape (18) has a protrusion (19, 21, 23) and a corresponding recession (20, 22, 24), and the protrusion and the corresponding recession are arranged on top of one another.

A further object of the present invention is a fiber optic module (10) wherein each first rail profile, and each second rail profile are (13, 15) is designed so that the fiber optic module (10) and the adjacent fiber optic module (10) may be coupled in a form-fitting connection in two directions orthogonal to a longitudinal axis of each of the first and second rail profiles (13, 15).

A further object of the present invention is a fiber optic module (10) and further comprising: a snap-in locking device (25) for fixing the fiber optic module (10) to the adjacent fiber optic module (10) when the fiber optic modules (10) are coupled to one another.

A further object of the present invention is a fiber optic module (10) and further comprising: a spring-loaded locking arm (26) carried by the snap in locking device, and the spring-loaded locking arm protrudes from at least one of the first or second outer walls (12, 14) in extension of a longitudinal axis of the respective outer wall (12, 14).

A further object of the present invention is a fiber optic module (10) and further comprising: a latching cavity (30) defined in at least one of the first and second rail profiles (13, 15); and a latch spring (31) in at least one of the first and second rail profiles (15, 13).

A further object of the present invention is a fiber optic module kit (9) for installation within a patch panel (1), the fiber optic module kit (9) comprising: plural fiber optic modules (10), each of the plural fiber optic modules (10) having, a first outer wall (12) having a first rail profile (13) on an outside surface of the first outer wall (12), a second outer wall (14) having a second rail profile (15) on an outside surface of the second outer wall (14), and an optical connector (11) between the first outer wall (12) and the second outer wall (14), and the first outer wall (12) and the second outer wall (14) are oriented parallel to one another, and the first rail profile (13) and the second rail profile (15) are complementary to each other so that the fiber optic module (10) may be coupled to an adjacent fiber optic module (10), and the first rail profile (13) of the fiber optic module (10) may be coupled to a second rail profile (15) of the adjacent fiber optic module (10); and the plural fiber optic modules (10) are coupled in a row via the first and second rail profiles (13, 15) of adjacent fiber optic modules (10).

A further object of the present invention is a fiber optic module kit (9) wherein at least two of the plural fiber optic modules (10) differ in at least one of size, arrangement of optical connectors (11), number of optical connectors (11), or type of optical connectors (11).

A further object of the present invention is an optical patch panel (1) for installation in a distribution frame, the optical patch panel (1) comprising: a fiber optic module kit (9), the fiber optic module kit (9) having, plural fiber optic modules (10), and each of the plural fiber optic modules (10) has, a first outer wall (12) having a first rail profile (13) on an outside surface of the first outer wall (12), a second outer wall (14) having a second rail profile (15) on an outside surface of the second outer wall (14), and an optical connector (11) between the first outer wall (12) and the second outer wall (14), and the first outer wall (12) and the second outer wall (14) are oriented parallel to one another, and the first rail profile (13) and the second rail profile (15) are complementary to each other so that the fiber optic module (10) may be coupled to an adjacent fiber optic module (10), and the first rail profile (13) of the fiber optic module (10) may be coupled to a second rail profile (15) of the adjacent fiber optic module (10); and the plural fiber optic modules (10) are coupled in a row via the first and second rail profiles (13, 15) of adjacent fiber optic modules (10); and a chassis (2) for receiving the at least one fiber optic module kit (9) and for mounting the patch panel (1) into the distribution frame.

A further object of the present invention is an optical patch panel (1) further comprising: barrier features (32) arranged inside the chassis (2) for limiting an insertion depth of at least one of the plural fiber optic modules (10) of the fiber optic module kit (9); and the barrier features (32) are arranged in a uniform pattern.

A further object of the present invention is an optical patch panel (1) wherein at least one of the barrier features (32), the fiber optic module kit (9), or at least one of the plural fiber optic modules (10) latches the fiber optic module kit (9) to at least one of the barrier features (32) when at least one of the fiber optic module kit (9) or the at least one fiber optic module (10) is fully inserted into the chassis (2).

A further object of the present invention is a fiber optic module (10) further comprising: plural optical connectors (11) arranged in a row between the first outer wall ( ) and the second outer wall ( ).

A still further object of the present invention is an optical patch panel (1) further comprising: barrier features (32) arranged inside the chassis (2) for limiting an insertion depth of at least one of the plural fiber optic modules (10) of the fiber optic module kit (9); and the barrier features (32) are arranged in a comb-like pattern.

An even still further object of the present invention is an optical patch panel (1) wherein at least one of the barrier features (32), the fiber optic module kit (9), or at least one of the plural fiber optic modules (10) latches the at least one fiber optic module (10), to at least one of the barrier features (32) when at least one of the fiber optic module kit (9) or the at least one fiber optic module (10) is fully inserted into the chassis (2).

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. A fiber optic module for installation within a patch panel, the fiber optic module comprising:
    a first outer wall having a first rail profile on an outside surface of the first outer wall;
    a second outer wall having a second rail profile on an outside surface of the second outer wall; and
    an optical connector between the first outer wall and the second outer wall; and wherein
    the first outer wall and the second outer wall are oriented parallel to one another; and wherein
    the first rail profile and the second rail profile are complementary to each other so that the fiber optic module may be releasably coupled to an adjacent fiber optic module, and wherein the first rail profile of the fiber optic module may be releasably coupled to a second rail profile of the adjacent fiber optic module; and
    a snap-in locking device for releasably fixing the fiber optic module to the adjacent fiber optic module when the fiber optic module, and the adjacent fiber optic module, are coupled to each other, the snap-in locking device comprising,
a first spring-loaded locking arm which protrudes from the first outer wall in extension of a longitudinal axis of the first outer wall, and a second spring-loaded locking arm which protrudes from the second outer wall in extension of a longitudinal axis of the second outer wall; and wherein
the fiber optic module is removable from the patch panel by manipulation of the first and second spring-loaded locking arms.

2. The fiber optic module as claimed in claim 1 and wherein the first outer wall is a first side wall; and the second outer wall is a second side wall.

3. The fiber optic module as claimed in claim 1 and further comprising:
plural optical connectors between the first outer wall and the second outer wall.

4. The fiber optic module as claimed in claim 1 and wherein the first rail profile and the second rail profile are aligned along a plug-in direction (x) of the optical connector.

5. The fiber optic module as claimed in claim 1 and wherein a shape of the first rail profile and a shape of the second rail profile are identical, and wherein the second rail profile is rotated by an angle of 180° relative to the first rail profile.

6. The fiber optic module as claimed in claim 1 and wherein each of the first and second rail profiles has one or more identical uniform profile shapes with each identical uniform profile shape having an equal step size which are arranged on top of one another; and wherein
each identical uniform profile shape has a protrusion and a corresponding recession, and the protrusion and the corresponding recession are arranged on top of one another.

7. The fiber optic module as claimed in claim 1 and wherein each first rail profile, and each second rail profile are designed so that the fiber optic module and the adjacent fiber optic module may be coupled in a form-fitting connection in two directions orthogonal to a longitudinal axis of each of the first and second rail profiles.

8. The fiber optic module as claimed in claim 1 and further comprising:
a latching cavity defined in at least one of the first and second rail profiles; and
a latch spring in at least one of the first and second rail profiles.

9. A fiber optic module kit for installation within a patch panel, the fiber optic module kit comprising:
plural fiber optic modules, each of the plural fiber optic modules having,
a first outer wall having a first rail profile on an outside surface of the first outer wall,
a second outer wall having a second rail profile on an outside surface of the second outer wall, and
an optical connector between the first outer wall and the second outer wall, and
the first outer wall and the second outer wall are oriented parallel to one another, and
the first rail profile and the second rail profile are complementary to each other so that the fiber optic module may be releasably coupled to an adjacent fiber optic module, and
the first rail profile of the fiber optic module may be releasably coupled to a second rail profile of the adjacent fiber optic module; and
the plural fiber optic modules are coupled in a row via the first and second rail profiles of adjacent fiber optic modules; and
a snap-in locking device for fixing the fiber optic module to the adjacent fiber optic module when the fiber optic module, and the adjacent fiber optic module, are releasably coupled to each other, the snap-in locking device comprising at least one of,
a first spring-loaded locking arm which protrudes from the first outer wall in extension of a longitudinal axis of the first outer wall, and a second spring-loaded locking arm which protrudes from the second outer wall in extension of a longitudinal axis of the second outer wall, or
a latching cavity defined in at least one of the first rail profile or the second rail profile, and a latch spring in the respective other first or second rail profile.

10. The fiber optic module kit as claimed in claim 9 and wherein at least two of the plural fiber optic modules differ in at least one of size, arrangement of optical connectors, number of optical connectors or type of optical connectors.

11. An optical patch panel for installation in a distribution frame, the optical patch panel comprising:
a fiber optic module kit, the fiber optic module kit having,
plural fiber optic modules, and each of the plural fiber optic modules has,
a first outer all having a first rail profile on an outside surface of the first outer wall,
a second outer wall having a second rail profile on an outside surface of the second outer wall, and
an optical connector between the first outer wall and the second outer wall, and
the first outer wall and the second outer wall are oriented parallel to one another, and
the first rail profile and the second rail profile are complementary to each other so that the fiber optic module may be releasably coupled to an adjacent fiber optic module, and
the first rail profile of the fiber optic module may be coupled to a second rail profile of the adjacent fiber optic module; and
the plural fiber optic modules are coupled in a row via the first and second rail profiles of adjacent fiber optic modules; and
a chassis for receiving the at least one fiber optic module kit and for mounting the patch panel into the distribution frame; and
a snap-in locking device for fixing the fiber optic module to the adjacent fiber optic module when the fiber optic module, and the adjacent fiber optic module, are coupled to each other, the snap-in locking device comprising at least one of,
a first spring-loaded locking arm which protrudes from the first outer wall in extension of a longitudinal axis of the first outer wall, and a second spring-loaded locking arm which protrudes from the second outer wall in extension of a longitudinal axis of the second outer wall, or
a latching cavity defined in at least one of the first rail profile or the second rail profile, and a latch spring in the respective other first rail profile or second rail profile.

12. The optical patch panel as claimed in claim 11 and further comprising:

barrier features arranged inside the chassis for limiting an insertion depth of at least one of the plural fiber optic modules of the fiber optic module kit; and the barrier features are arranged in a uniform pattern.

13. The optical patch panel as claimed in claim 12 and wherein at least one of the barrier features, the fiber optic module kit, or at least one of the plural fiber optic modules latches the fiber optic module kit to at least one of the barrier features when at least one of the fiber optic module kit or the at least one fiber optic module is fully inserted into the chassis.

14. The fiber optic module as claimed in claim 2 and further comprising:

plural optical connectors arranged in a row between the first outer wall and the second outer wall.

15. The optical patch panel as claimed in claim 11 and further comprising:

barrier features arranged inside the chassis for limiting an insertion depth of at least one of the plural fiber optic modules of the fiber optic module kit; and the barrier features are arranged in a comb-like pattern.

16. The optical patch panel as claimed in claim 12 and wherein at least one of the barrier features, the fiber optic module kit, or at least one of the plural fiber optic modules latches the at least one fiber optic module, to at least one of the barrier features when at least one of the fiber optic module kit or the at least one fiber optic module is fully inserted into the chassis.

17. A fiber optic module for installation within a patch panel, the fiber optic module comprising:

a first outer wall having a first rail profile on an outside surface of the first outer wall;

a second outer wall having a second rail profile on an outside surface of the second outer wall;

an optical connector, between the first outer wall and the second outer wall; and wherein the first outer wall and the second outer wall are oriented parallel to one another; and wherein the first rail profile and the second rail profile are complementary to each other so that the fiber optic module may be coupled to an adjacent fiber optic module, and wherein the first rail profile of the fiber optic module may be coupled to a second rail profile of the adjacent fiber optic module; and a snap-in locking device for fixing the fiber optic module to the adjacent fiber optic module when the fiber optic and the adjacent fiber optic module are coupled to each other, the snap-in locking device comprising, a latching cavity defined in one of the first rail profile or the second rail profile, and a latch spring in the respective other first rail profile or second rail profile.

\* \* \* \* \*